(12) United States Patent
Ibitayo et al.

(10) Patent No.: US 7,031,976 B1
(45) Date of Patent: Apr. 18, 2006

(54) COMPUTER FRAMEWORK AND METHOD FOR ISOLATING A BUSINESS COMPONENT FROM SPECIFIC IMPLEMENTATIONS OF A DATASTORE

(75) Inventors: Kemi Y. Ibitayo, Euless, TX (US); Joey Levi, Dallas, TX (US); Dwayne T. Smith, Coppell, TX (US); Scott T. Terrell, Keller, TX (US); James B. Tucker, Lewisville, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/579,623

(22) Filed: May 26, 2000

(51) Int. Cl.
*G06F 17/30* (2006.01)

(52) U.S. Cl. .................. 707/103 R; 707/100; 707/202; 709/101

(58) Field of Classification Search .................. 707/2, 707/3, 103 R, 5, 10, 206, 517; 709/101, 709/100, 202; 706/46
See application file for complete search history.

(56) References Cited

U.S. PATENT DOCUMENTS

| | | | | |
|---|---|---|---|---|
| 5,689,645 A | * | 11/1997 | Schettler et al. | 709/100 |
| 5,692,183 A | | 11/1997 | Hapner et al. | 395/614 |
| 5,727,203 A | | 3/1998 | Hapner et al. | 395/614 |
| 5,794,256 A | | 8/1998 | Bennett et al. | 707/206 |
| 5,848,419 A | | 12/1998 | Hapner et al. | 707/100 |
| 5,864,866 A | * | 1/1999 | Henckel et al. | 707/103 R |
| 5,878,419 A | * | 3/1999 | Carter | 707/10 |
| 5,913,061 A | * | 6/1999 | Gupta et al. | 709/101 |
| 6,006,224 A | * | 12/1999 | McComb et al. | 707/102 |
| 6,009,266 A | * | 12/1999 | Brownell et al. | 709/202 |
| 6,016,495 A | * | 1/2000 | McKeehan et al. | 707/102 |
| 6,102,969 A | * | 8/2000 | Christianson et al. | 707/10 |
| 6,442,748 B1 | * | 8/2002 | Bowman-Amuah | 707/103 R |
| 6,453,333 B1 | * | 9/2002 | Glynias et al. | 707/10 |
| 6,499,023 B1 | * | 12/2002 | Dong et al. | 706/46 |
| 6,532,465 B1 | * | 3/2003 | Hartley et al. | 707/5 |
| 6,539,378 B1 | * | 3/2003 | Gupta et al. | 707/5 |
| 6,721,747 B1 | * | 4/2004 | Lipkin | 707/10 |

* cited by examiner

*Primary Examiner*—Jeffrey Gaffin
*Assistant Examiner*—Hassan Mahmoudi (57) ABSTRACT

The present invention relates to a computer framework and method for a business component to retrieve data from a backend datastore using object technology. The invention discloses a method for isolating a business component from specific implementations of a datastore, including the steps of supplying a database wrapper; using the database wrapper to begin a database session; supplying a domain object factory; using the domain object factory to create a domain object; converting the domain object from a persistent state to a transient state; ending the database session; and returning the domain object to the business component. The invention further discloses a framework for isolating a business component from specific implementations of a datastore, comprising a database wrapper in communication with a business component; a domain object factory in communication with the database wrapper; a domain object in communication with the domain object factory; and a datastore in communication with the domain object.

10 Claims, 4 Drawing Sheets

COMPUTER FRAMEWORK AND METHOD FOR ISOLATING A BUSINESS COMPONENT FROM SPECIFIC IMPLEMENTATIONS OF A DATASTORE

BACKGROUND OF THE INVENTION

The present invention relates to a computer framework and method for a business component to retrieve data from a variety of backend datastores using object technology. The invention provides for the creation, retrieval, updating, and deletion of objects in one or more datastores without having to know the vendor specific application programming interfaces (APIs) of the datastores.

In designing a composite, enterprise-wide computing system for a business, it is desirable to divide the system architecture into layers or levels that are independent of ones below it. This is known as multilevel modularity, wherein the functionality of each level is independent of its uses in higher levels and the structure of lower levels. Multilevel modularity is advantageous as it allows for changes to a given level without disturbing other levels.

The business components of a computing system contain the business rules or functionality of a given application, and thus constitute a relatively high level system. In executing an application, business components often have to interact with a lower level datastore to create, retrieve, update, and delete data following processing by the application. Business components ideally are wholly reusable and independent of any underlying data source.

Business components can be programmed to interact directly with a datastore, but this is a burdensome and inflexible process. For example, database vendors each have a unique set of application programming interfaces (APIs) which allow applications to create, retrieve, update, and delete data from the database. Not only do these API's vary by vendor, but they also vary by the type of datastore. The API's for a relational database typically are much different from the API's for an object database, and so on. Thus, the problem is that a business component must contain specific code for each individual datastore accessed by the component. If a datastore is added, deleted, or modified, the business application code must be modified as well.

The current invention addresses the need for an enterprise-level framework and method to isolate higher level systems implementing business applications (herein referred to as business components) from middle level systems (herein referred to as domain objects) accessing persistent data stored in a variety of differing lower-level datastores. The invention provides a single interface for the business component to perform datastore manipulations that might otherwise require multiple separate interfaces. The current invention further addresses the domain objects' need for datastore neutrality and abstraction; their need to be pure in implementation; and their need to be independent of any architectural level including any underlying persistent datastore level.

SUMMARY OF THE INVENTION

The present invention relates to a computer framework and method for a business component to retrieve data from a backend datastore. The invention discloses a method for isolating a business component from specific implementations of a datastore, comprising supplying a database wrapper; using the database wrapper to begin a database session; supplying a domain object factory; using the domain object factory to create a domain object; converting the domain object from a persistent state to a transient state; ending the database session; and returning the domain object to the business component.

The invention further discloses a method for isolating a business component from specific implementations of a datastore, comprising interfacing a database wrapper to a business component; implementing the database wrapper; interfacing a domain object factory to the database wrapper; implementing the domain object factory; interfacing a domain object to the domain object factory; and implementing the domain object to retrieve data from a datastore. The method may further comprise the step of converting data retrieved from the datastore from a persistent state to a transient state.

The invention further discloses a framework for isolating a business component from specific implementations of a datastore, comprising a database wrapper in communication with a business component; a domain object factory in communication with the database wrapper; a domain object in communication with the domain object factory; and a datastore in communication with the domain object. The database wrapper further comprises a database wrapper interface in communication with the business component and a database wrapper implementation implementing the domain object factory. The domain object factory further comprises a domain object interface in communication with the database wrapper and a domain object factory implementation implementing the domain object. The domain object further comprises a domain object interface in communication with the domain object factory and a domain object implementation retrieving data from a datastore. The domain object interface further comprises a transient data converter for converting the domain object from a persistent state to a transient state.

DETAILED DESCRIPTION OF THE INVENTION

Figure 1:
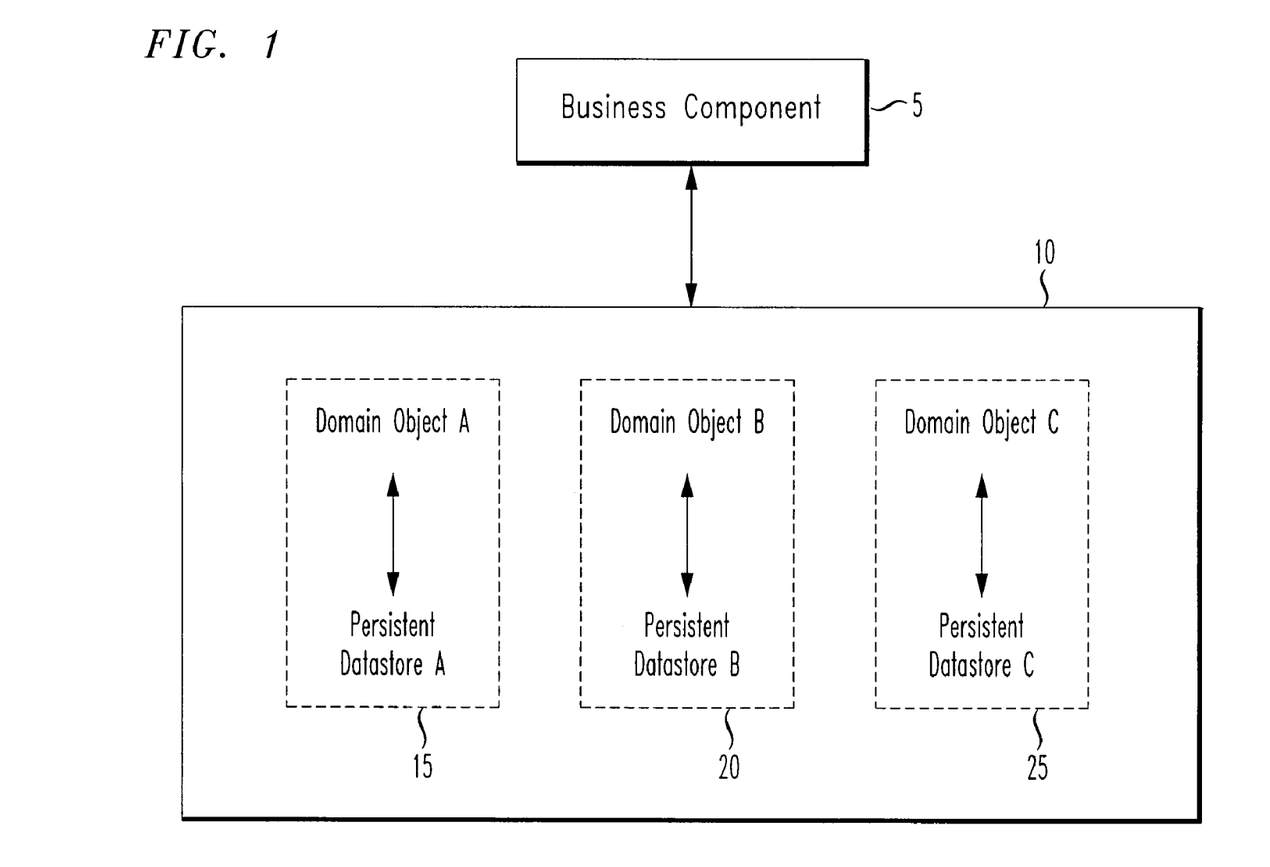
FIG. 1 is a graphical representation of the invention.

As shown in FIG. 1, the current invention provides a business component 5 with a common interface 10 to a plurality of domain objects 15, 20, and 25 stored in a variety of datastores, thereby decoupling the storage of data from a specific type of datastore. The invention provides a framework and method for accessing data from different types of datastores while maintaining a common interface to the existing business functions/applications being carried out by the business component. The advantage of the current invention is that it provides a single interface to perform datastore manipulation that would otherwise require two or more separate interfaces. In other words, the invention encapsulates the capabilities of multiple datastores into a single interface.

Datastore as used herein means any type of data storage software device or medium, including datafiles, databases, memory chips, hard drives, floppy drives, magnetic storage media, optical storage media, and the like. Preferably, the datastore is a database, which can be either a relational or object database. Examples of suitable databases are relational databases produced by Oracle, Inc. and object databases produced by Versant Inc. The datastore can be located remotely and accessed by means such as the Object Management Group's Common Object Request Broker Architecture (CORBA), which communicates with underlying datastores such as relational databases. When the underlying datastore comprises a relational database, object-relational (O-R) mapping tools, such as TOPLink produced by The Object People, Inc., may be used in carrying out the invention. As known to those skilled in the art, O-R mapping tools serve as a communications bridge between object technology and relational database technology. Likewise, the Java/Versant interface (JVI) available from Versant Inc. can be used in carrying out this invention to serve as a communications bridge between the Java programming language (which is available from Sun Microsystems Inc.) and object databases produced by Versant Inc.

The first step in developing a domain object is to create its interface. An interface (also known as a message interface) is a communication surface that determines the signals (e.g., calls) that can pass through the surface; in other words, the interface defines which calls an object will respond to. An interface can contain other object interfaces, allowing interfaces to be mixed and matched across objects. A domain object's interface should define those having access to the object (e.g., its public accessors) as well as any functionality (e.g., behavior) for the domain object. Return types and parameter types in domain object interfaces will consist of basic types (string, integer, boolean, etc.) and other domain object interface types (address, contact, etc.). An interface for a domain object referred to hereinafter as Customer is created by the following programming code:

```
public interface Customer {
    //Accessors for name
    public String getName();
    public void setName(String name);
    //Accessors for address
    public Address getAddress();
    public void setAddress(Address address);
    public boolean isValid();
}
```

While the code examples herein are written in the Java programming language, which is available from Sun Microsystems Inc., it is understood that other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples.

Interfaces keep business components and other programming code neutral to the implementation of domain objects. For example, the interface for Customer is visible to a business component. A developer can create multiple implementations of Customer that implement the Customer interface, which a program developer might do if Customer can reside in either an object database or in a relational database. Because the implementations conform to the Customer interface, each implementation can be used wherever Customer is needed. This makes the business components highly reusable; if the underlying database of a domain object changes, the business component can simply "plug in" the appropriate implementation for its domain objects. In sum, the domain object interface is wholly reusable and database neutral.

Because it is desireable to keep business components as reusable as possible, developers preferably do not directly create domain objects through code such as:

```
public class BusinessComponent {
    public Customer createCustomer(String name, Address address) {
        Customer customer = new CustomerImpl(name, address);
        return customer;
    }
}
```

The preferred method for creating domain objects is through a domain object factory, as discussed below.

The second step in creating a domain object is to implement it, and a separate implementation must be performed for each database in which the domain object is stored. The implementation of a domain object consists of a class definition that implements the domain object interface. As used in object technology, a class defines the methods and variables for a particular type of object; all objects of a given class are identical in form and behavior but contain different data in their variables. Accessors are the methods on a class that provide access to the variables of the class (for example, get and set commands). The class name must be different from the interface name, and for ease of reference the letters "Impl" (an abreviation of implementation) are added to the end of the interface name. Implementation of the interface for the Customer domain object is as follows:

```
public class CustomerImpl implements Customer {
    private String name;
    private Address address;
    public String getName() {
        return name;
    }
    public void setName(String name) {
        this.name = name;
    }
    public Address getAddress() {
        return address;
    }
    public void setAddress(Address address) {
        this.address = address;
    }
```

Figure 2:
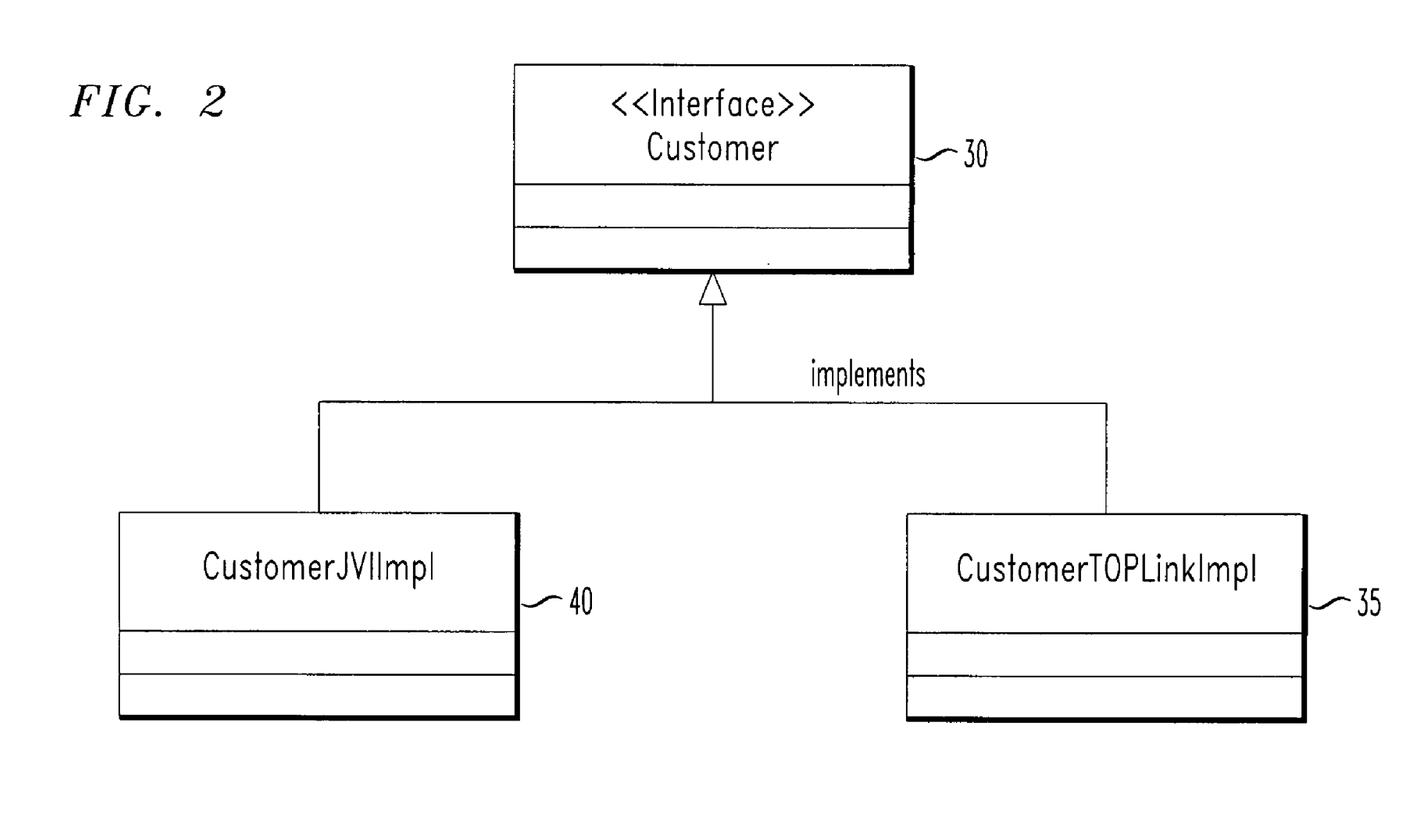
FIG. 2 is a domain object class diagram.

As shown in FIG. 2, a domain object is implemented for each database in which its state resides. State as used herein refers to the persistent data residing in an underlying datastore which defines the variables for a given instance of a domain object. If Customer state can reside in an object database as well as a relational database, a developer creates a Customer implementation for the object database and a separate implementation for the relational database.

The storage and retrieval of data by a domain object from a persistent datastore is accomplished by implementation of methods contained within the domain object and is represented by boxes 15, 20, and 25 in FIG. 1. An instance of the domain object is created upon implementation, which is also referred to as an instantiation of the domain object. More specifically, Domain Object A is a domain object instantiation created by retrieving data from Persistent Datastore A by implementing the data retrieval methods contained within the domain object, and so on.

Often, domain object classes are named to reflect the database in which they reside. As shown in FIG. 2, the Customer domain object 30 can be implemented from relational database 35 by using the TOPLink object-relational mapping tool; from object database 40, for example by using a Java/Versant interface (JVI); or from any number of other datastores known to those skilled in the art. As shown in FIG. 2, regardless of the underlying datastore (and supplemental communications bridge such as TOPLink, JVI, or otherwise), the interface for the Customer domain object remains the same to the business component accessing it.

Implementation of the Customer domain object residing in a relational database accessed via the TOPLink O-R mapping tool is defined as follows:

```
Public class CustomerTOPLinkImpl implements Customer {
    protected String name;
    protected ValueHolderInterface address;
    public String getName() {
        return name;
    }
    public void setName(String name) {
        this.name = name;
    }
    public Address getAddress() {
        //implemented later
    }
    public void setAddress(Address newAddress) {
        //implemented later
    }
    private ValueHolderInterface getAddressHolder() {
    return address;
    }
    private void setAddressHolder(ValueHolderInterface holder) {
    address = holder;
    }
    public void isValid() {
        //some validation code
    }
}
```

In this class definition, CustomerTOPLinkImp1 is the name of the class. "Customer" has been appended with "TOPLinkImp1" to show that it is a TOPLink implementation for the Customer domain object. The class CustomerTOPLinkImp1 implements the Customer interface and can be used wherever Customer is specified in code.

Preferably, a business component has visibility to the domain object interface type rather than the class type. The following code is not desirable since the business component interacts directly with the class:

```
public class BusinessComponent {
    public Customer createCustomer(args) {
        Customer customer = new CustomerTOPLinkImpl();
        return customer;
    }
}
```

The problem with the above code is that by calling new on the class CustomerTOPLinkImp1, the BusinessComponent class must be re-implemented if the database for Customer domain objects changes. The BusinessComponent would have the same code as above but call the constructor for another Customer implementation. Preferably, business components never use new directly. The preferred method for creating domain objects is use of a domain object factory, as discussed below.

Since the implementation of a domain object is specific to a datastore, the domain object's variables (also known as fields or attributes) can be defined using the datastore's particular data types. Accessors are the commands (e.g., APIs) used to access persistent datasets from datastores, said datasets providing the values (or "state") for the domain object's variables/fields. All domain object interfaces preferably have accessors that operate in terms of standard Java standard datatypes (e.g., Boolean, String, Integer, etc.) or other domain object interface types (e.g., Customer, Address, etc.), thereby maintaining the datastore neutrality of a business component utilizing the domain object accessor. Although domain object accessors operate in terms of Java standard datatypes, the internal domain object implementations can be in terms of datastore specific types. In the case of a Versant object database, the type Handle can be used for references to other domain objects. In the case of a relational database accessed via the TOPLink OR mapping tool, the ValueHolder type can be used to reference other domain objects. The use of these standard API types helps exploit efficiencies in the database implementation but adds constraints to field access. The following code illustrates the use of accessors on a Customer domain object residing in a relational database accessed via the TOPLink OR mapping tool. The interface is as follows:

```
public interface Customer {
    public Address getAddress();
    public void setAddress(Address address);
}
```

And the class is as follows:

```
public class CustomerTOPLinkImpl implements Customer {
    protected String name;
    protected ValueHolderInterface address;
    public String getName() {
        return name;
    }
    public void setName(String name) {
        this.name = name;
    }
    public Address getAddress() {
        return (Address) address.getValue();
    }
    public void setAddress(Address newAddress) {
        address.setValue(newAddress);
    }
    private ValueHolderInterface getAddressHolder() {
    return address;
    }
    private void setAddressHolder(ValueHolderInterface holder) {
    address = holder;
    }
    public void isValid() {
        //some validation code
    }
}
```

In this code, Address is an interface type. There are two pairs of accessors for the address field. The first pair is defined on the Customer interface and provides a view of the Customer's internal state consistent with a pure domain model; in other words, the first pair is called by and maintains a generic interface to the business component. The first pair of accessors uses TOPLink commands to convert the ValueHolder into an Address and back to a ValueHolder. The second pair is a private view for internal and infrastructure use; in other words, the second pair is called the domain object and invokes TOPLink commands to retreive data from a relational database. The second pair of accessors sets and gets a TOPLink ValueHolder.

Domain objects are considered persistent while in context of a database session and are not valid outside the database session. Therefore, the domain objects should be made transient (i.e., not tied to the database session) before being passed to a business component. A transient domain object is a database neutral implementation of the domain object interface. For a Customer domain object, the developer creates a Customer interface, a CustomerTOPLinkImpl class (for TOPLink implementation), and a CustomerTransientImpl class. The CustomerTransientImpl class contains no database specific types or code. The CustomerTOPLinkImpl class includes a conversion method to convert the domain object from a persistent to a transient state (e.g. CustomerTransientImpl). Such conversion methods are commonly known to those skilled in the art. In the following code, the conversion method is referred to as copyTransient( ) and is defined on the Customer domain object interface:

```
public interface Customer {
    Customer copyTransient();
}
```

The implementation of the Customer interface would then implement the conversion method copyTransient( ).

```
//Database implementation
public class CustomerTOPLinkImpl implements Customer {
    protected String name;
    protected ValueHolderInterface address;
    Customer copyTransient() {
        Return new CustomerTransientImpl(name,
            GetAddress().copyTransient());
    }
    .........
}
//Transient implementation
public class CustomerTransientImpl implements Customer {
    protected String name;
    protected Address address;
    Customer copyTransient() {
        return this;
    }
}
```

In the database implementation above, copyTransient( ) constructs a transient Customer domain object with its fields. CopyTransient( ) must be called on all fields that reference other domain objects. In the example above, the field address references an Address domain object. Therefore, copyTransient( ) is sent to the address field.

As discussed above in accordance with this invention, business components do not directly create domain objects, but rather use domain object factories. Domain object factories contain methods that allow for creation and querying of domain objects, thereby creating domain objects and retrieving them from the datastore. The creation of the object factories, and in particular domain object factories, of a type used in this invention will be familiar to one of skill in the art and need not be explained in detail here.

Figure 3:
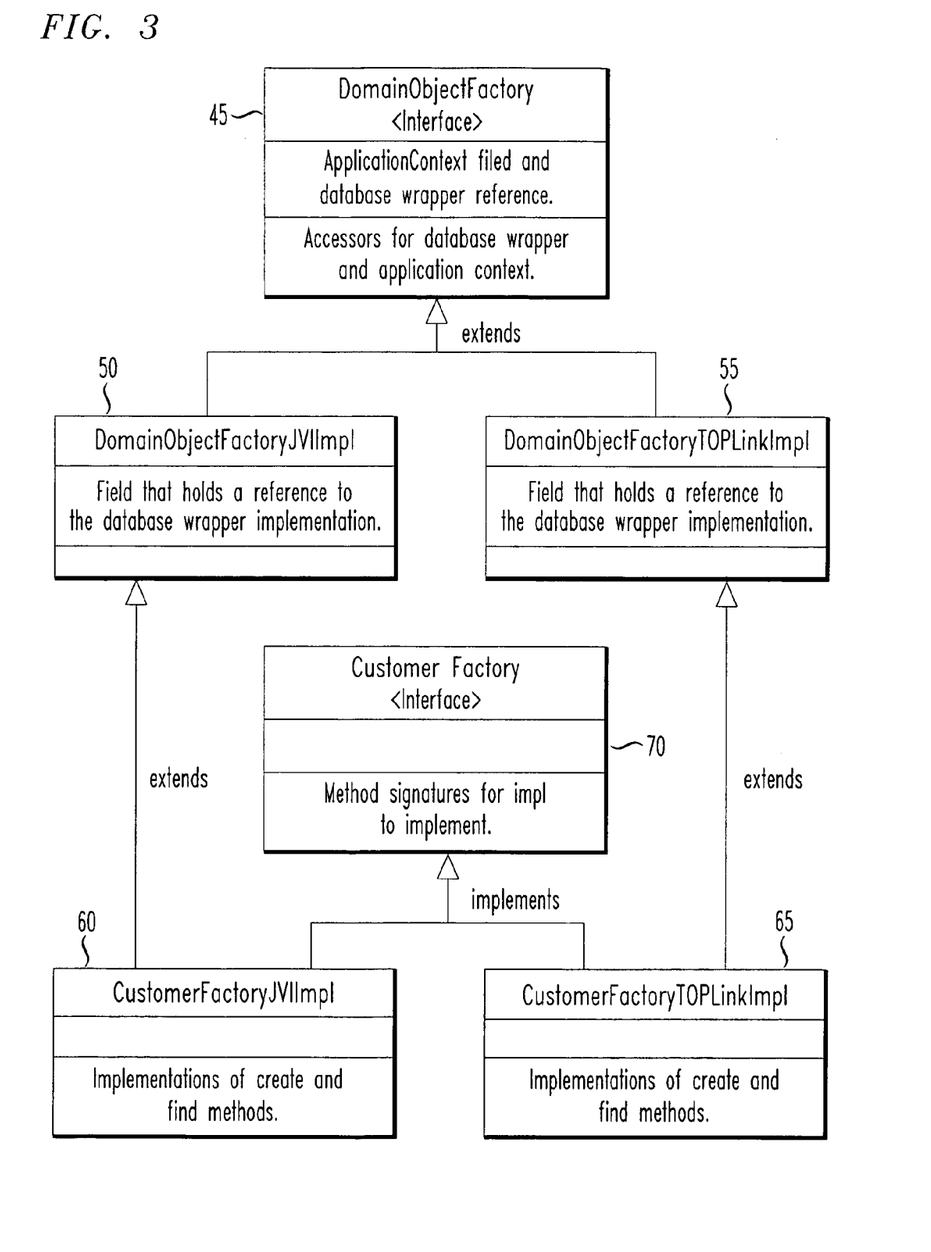
FIG. 3 is a domain object factory class diagram.

The domain object factory framework parallels the domain object framework. As shown in FIG. 3, domain object factories consist of an interface 45 that specifies create and find methods available on the domain object factory and separate implementations 50 and 55 specific to each datastore. Interface 45 for the domain object factory allows the business component to interact with a single interface while having the ability to "plug in" various datastore specific implementations, thereby maintaining the boundary between implementation specifics and the business component. The developer implements a datastore-specific domain object factory 60 or 65 for each datastore containing the requested domain object (e.g., Customer). Customer factory 70 returns interface types for Customer domain objects.

The domain object factory code framework parallels the domain object code framework:

```
public interface CustomerFactory {
    public Customer create();
    public Customer findByName(String name);
    public Vector findAll();
}
public class CustomerFactoryTOPLinkImpl
    extends DomainObjectFactoryTOPLinkImpl
    implements CustomerFactory {
        public Customer create() {
            return new CustomerTOPLinkImpl();
        }
        public Customer findByName(String name) {
            //code to query TOPLink for a Customer by name
            return customer;
        }
        public Vector findAll() {
            //code to query TOPLink for all customers
            return customers;
        }
}
```

The domain object factory is a convenient location for datastore queries. Any query that needs to be performed for a given domain object type is placed in a "find" method on the domain object factory implementation. The find method can make full use of datastore specific code to generate queries, and thus a reason for separating the domain object factory interface from the implementation.

Since a domain object factory implementation is specific to a given datastore, there must be a factory, herein referred to as a database wrapper, for the domain object factories. This is also parallel to the domain object framework. Preferrably, a business component does not directly instantiate a domain object factory.

Figure 4:
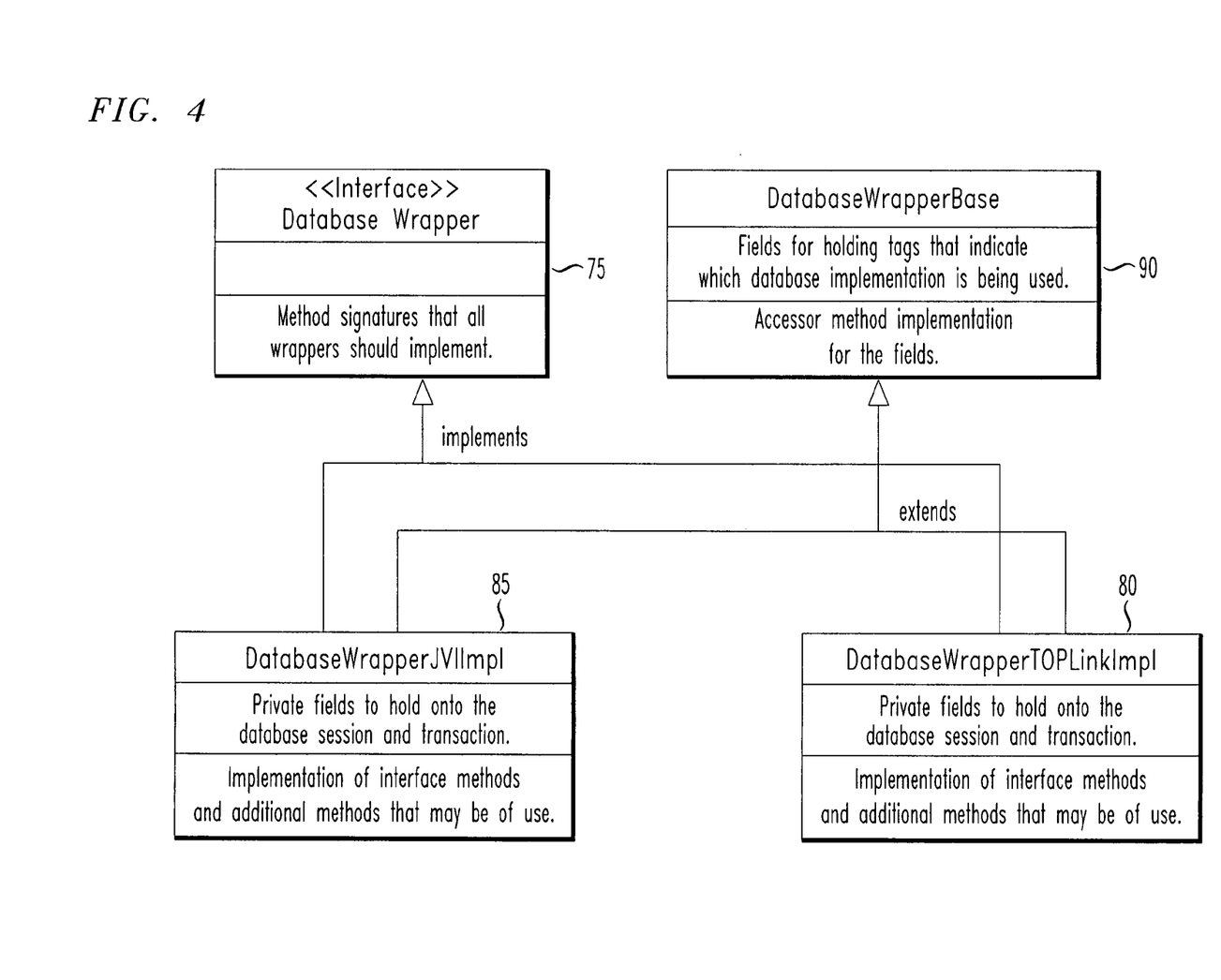
FIG. 4 is a database wrapper class diagram.

The database wrapper provides an API for session and transaction management which allows access to datastore (typically a database) functionality. The database wrapper is also the factory for creating domain object factories. As shown in FIG. 4, the database wrapper interface 75 is used in the business component while the actual implementation type (e.g., DatabaseWrapperTOPLinkImpl 80 or DatabaseWrapperJVIImpl 85) is used in the domain object factory methods. Database wrapper implementations are retrieved by passing a properties object and a data source name to a method on the base class from a datastore (e.g., DatabaseWrapperBase 90) which will return the specific database wrapper implementation (e.g., DatabaseWrapperTOPLinkImpl 80). The creation of the database wrappers of a type used in this invention will be familiar to one of skill in the art.

To retrieve a domain object factory from the database wrapper, the developer simply calls a method on the database wrapper specifying the class name of the domain object factory to retrieve. The method returns type Object, so a developer must cast the return value to the specific factory type as follows:

```
{
    ...//get database wrapper using getDatabaseWrapper;
    DatabaseWrapper dbWrapper =
        DatabaseWrapperBase.getDatabaseWrapper(properties,
        "CustomerDB");
    CustomerFactory customerFactory = (CustomerFactory)
        dbWrapper.getDomainObjectFactory(CustomerFactory.class);
    ...
}
```

Once obtained, the domain object factory can be used to create and find domain objects as discussed previously.

EXAMPLE

To achieve a common interface for each domain object, a business component operating in accordance with the invention typically follows the following steps: obtain a database wrapper from a datastore (e.g., a database); begin a database session; obtain a domain object factory from a datastore; create, find, and use domain objects from a datastore; convert the domain object from a persistent to a transient state; end the database session; and return requested information to the business component/application. The information returned to the business component can be in the form of transient domain objects. The following pseudo-code outlines a typical business component code for a domain object referred to as Customer:

```
public Customer getCustomer(String id) {
    // get the database wrapper from the DatabaseWrapperBase
    // appCtx is a member variable of the business component
    DatabaseWrapper dbWrapper =
        DatabaseWrapperBase.getDatabaseWrapper(properties,
        "CustomerDB");
    // begin a database session
    dbWrapper.beginSession();
    // get the domain object factory for customer
    CustomerFactory cf = (CustomerFactory)
        dbWrapper.getDomainObjectFactory(CustomerFactory.class);
    // get a customer domain object from the factory using a find method
    Customer customer = cf.findById(id);
    //alternatively, perform functions with customer
    // while still in the session, convert the persistent customer to
    // transient
    Customer transientCustomer = customer.transientCopy();
    // end the database session
    dbWrapper.endSession();
    // return the transient customer
    return transientCustomer;
}
```

What is claimed is:

1. A framework for isolating a business component from specific implementation of a datastore, comprising:
   (a) a database wrapper in communication with a business component;
   (b) a domain object factory in communication with the database wrapper;
   (c) a domain object in communication with the domain object factory; and
   (d) a datastore in communication with the domain object, wherein the database wrapper provides an additional abstraction layer between the domain object factory and the business component;
   wherein the domain object factory further comprises a domain object interface in communication with the database wrapper and a domain object factory implementation implementing the domain object;
   wherein the domain object further comprises a domain object interface in communication with the domain object factory and a domain object implementation retrieving data from a datastore; and
   wherein data is converted from a persistent state to a transient state prior to being passed from the database wrapper to the business component.

2. The framework of claim 1 wherein the database wrapper further comprises a database wrapper interface in communication with the business component and a database wrapper implementation implementing the domain object factory.

3. The framework of claim 2 wherein the datastore is a relational database.

4. The framework of claim 2 wherein the datastore is an object database.

5. The framework of claim 2 wherein the datastore is accessed remotely.

6. A method for isolating a business component from specific implementation of a datastore, comprising:
   (a) interfacing a database wrapper to a business component;
   (b) implementing the database wrapper;
   (c) interfacing a domain object factory to the database wrapper;
   (d) implementing the domain object factory;
   (e) interfacing a domain object to the domain object factory; and
   (f) implementing the domain object to retrieve data from a datastore, wherein the database wrapper provides an additional abstraction layer between the domain object factory and the business component;
   wherein the domain object factory comprises a domain object interface in communication with the database wrapper and a domain object factory implementation implementing the domain object;
   wherein the domain object comprises a domain object interface in communication with the domain object factory and a domain object implementation retrieving data from a datastore; and
   wherein data is converted from a persistent state to a transient state prior to being passed from the database wrapper to the business component.

7. The framework of claim 6 wherein the datastore is a relational database.

8. The framework of claim 6 wherein the datastore is an object database.

9. The framework of claim 6 wherein the datastore is accessed remotely.

10. A method for isolating a business component from specific implementation of a datastore, comprising:
    (a) supplying a database wrapper;
    (b) using the database wrapper to begin a database session;
    (c) using the database wrapper to obtain a domain object factory;

(d) using the domain object factory to create a domain object;
(e) converting the domain object from a persistent state to a transient state;
(f) ending the database session; and
(g) returning the domain object to the business component, wherein the database wrapper provides an additional abstraction layer between the domain object factory and the business component;
wherein the domain object factory comprises a domain object interface in communication with the database wrapper and a domain object factory implementation implementing the domain object;
wherein the domain object comprises a domain object interface in communication with the domain object factory and a domain object implementation retrieving data from a datastore; and
wherein data is converted from a persistent state to a transient state prior to being passed from the database wrapper to the business component.

* * * * *